Nov. 30, 1965 H. H. ADELAAR ETAL 3,221,103

CONTROL SYSTEM FOR COMMUNICATION NETWORK

Filed July 19, 1961 3 Sheets-Sheet 1

Inventors
H. H. ADELAAR
F. CLEMENS
J. L. MASURE
By Paul W. Hemminger
Attorney

CONTROL SYSTEM FOR COMMUNICATION NETWORK

Filed July 19, 1961 3 Sheets-Sheet 2

Inventor
H. H. ADELAAR
F. CLEMENS
J. L. MASURE
By Paul W. Hemminger
Attorney

CONTROL SYSTEM FOR COMMUNICATION NETWORK

Filed July 19, 1961 3 Sheets-Sheet 3

*Inventor*
H. H. ADELAAR
F. CLEMENS
J. L. MASURE
By Paul W. Hemminger
*Attorney*

3,221,103
Patented Nov. 30, 1965

3,221,103

CONTROL SYSTEM FOR COMMUNICATION NETWORK

Hans H. Adelaar, Frans Clemens, and Jean Louis Masure, all of Antwerp, Belgium, assignors to International Standard Electric Corporation, New York, N.Y., a corporation of Delaware Filed July 19, 1961, Ser. No. 125,238
Claims priority, application Belgium, July 28, 1960, 593,490
16 Claims. (Cl. 179—18)

The invention relates to a control system for a communication network comprising a plurality of time division multiplex junctions hereinafter called highways which are corresponding circuit groups between which connections have to be established, slave control equipments being associated with each of said highways, and each of the slave equipments storing data relating to connections established by sampling according to the time division multiplex principle between said circuits served by the corresponding highways, and a main control equipment intended to be selectively associated to said slave control equipments, the function of this main control equipment being to control the communications, i.e. namely their establishment, their routing and their interruption as well as the supervision of these communications during the time they are established.

Throughout the course of this description, it will be convenient to use one or more forms of the term "staticize." Thus, it may be well to here give a few words of explanation so that the term may be better understood. It means an interval of time during which certain data, pertaining to a call, is written into or read out of a memory.

The two distinct objects of the two main control equipments described herein are the supervision of an established connection on the one hand and the establishment or the release of a connection on the other. In other words, these two main control equipments correspond to a multiple supervision circuit and a multiple register circuit.

In brief, the scanning cycles for these two control equipments are different because the number of supervision words is different from the number of register words. In a large exchange, the number of supervision words corresponding to the number of established connections, to be simultaneously supervised, must be of the order of a thousand. Whereas, the number of register words corresponding to connections being established or being released is much lower and may be of the order of a hundred. This is for a rate of traffic corresponding to what is encountered in practice. Each of these words, whether a supervision word or a register word is only accessible during a well defined predetermined time interval which is called the "staticizing time."

Assuming that the staticizing time for each word is the same for the supervision and the register words, it is clear that with the figures given in the above example, the supervision scanning cycle will be much longer than the register scanning cycle. In other words, one should have access to information pertaining to an established connection much less frequently than to a connection being established. But for the latter, it is clear that the scanning cycle cannot exceed a predetermined value since one must be able to detect opening of the loop caused by dialing.

But if both the register and supervision words are stored in the same memory, the scanning cycle will thus be the product of the staticizing time multiplied by the sum of both the register and supervision words. It is clear that in view of the large number of supervision words, it will be necessary to have a rather short staticizing time if one must be able to have access to any register word at the most say every 16 m./sec. to correspond with the usual dial pulse frequency. To have a short staticizing time is a drawback since in particular it will mean higher speed logic circuit. Moreover, if the staticizing time is smaller than the sampling period of say 100 m./sec. in a time division multiplex system this complicates the control on the slave circuits which are those circuits directly controlling the opening of the gates of the TDM system.

Such a system is already known from the U.S. Patent No. 3,157,774 (E. Wright et al.) and also from the main patent (U.S. patent application S.N. 74,434, filed December 7, 1960, H. Adelaar et al.) which will hereinafter be called the aforementioned patent. In the latter patent, a system is described in which the main control equipment is mainly constituted by a sequential access main memory provided with staticizing devices which regularly read out, according to a predetermined cycle, the various data stored in the main memory. According to the aforementioned patent, a particularly advantageous association is realized between the main control equipment and the control equipments directly associated to the highways by taking care that the duration of the staticizing time of the main memory is at least equal to a sampling period of the time division multiplex system. In this way, as explained in this patent, each time an information concerning a given communication is staticized by the main memory, the staticizing devices may be selectively connected and without delay to one or more equipments associated to highways.

In a communication system such as a telephone exchange, such a main control equipment may for instance be realized by means of a coordinate memory using magnetic cores having a substantially rectangular hysteresis cycle. An access switch is provided to address successively the various rows of such a memory, each of these rows containing a word belonging to a given communication. This makes this word appear in the form of the presence or the absence of pulses on column wires connected to corresponding bistable trigger devices and constituting the staticizing device of the main control equipment. The various words of such a memory may advantageously relate either to communications being established or to communications which are already established and which have to be supervised by the main control equipment, or still to communications which are about to be released. Such a memory may thus have a function corresponding to that of the supervision equipment in a conventional telephone exchange as well as to that of the registers used in the systems with indirect control of the establishment of the communications. The number of words, or the number of rows of this main memory will be a function of the traffic of the exchange, i.e. the number of words for which the supervision data will be registered will be a function of the number of conversations which may simultaneously take place in the exchange, whereas the number of words giving register data and serving for establishing new communications will be a function of the number of communications which should be able to be established simultaneously, this number being of course smaller than the preceding one. By way of example, one may assume a main memory for an exchange having a limited number of lines which comprises 100 words, 90 supervision words and 10 register words. In this way, and particularly if the staticizing time is higher than the sampling period, as is the case in the already mentioned patent, the staticizing cycle of a word will at least be equal to 10 milliseconds if a sampling frequency of 10 kilocycles is considered. But, one of the functions of the words constituting the register data is to register the calling subscriber's number received in the form of dial pulses. As the data concerning the establishment of a given communication are only staticized during a relatively short time interval and at a repetition period at least equal to 10 milliseconds and as these data may only be modified under the control of the dial pulses during this relatively short time, it is clear that the repetition period should not be too long with respect to the sending frequency of the dial pulses. In other words, an opening in the subscriber's loop may not be produced between two staticizing times since such an opening of the loop would not be detected by the main control equipment and this would of course give rise to the registering of a wrong called subscriber's digit. With the existing dials, one may reckon that each word corresponding to the register and more particularly the bistable devices staticizing this word, should have access to the condition of the calling subscriber's loop at least each 16 m.s. (milliseconds). In the example considered above, the staticizing rhythm of the main memory is thus satisfactory.

However, in a more important exchange and particularly in a telephone exchange of 10,000 lines, the number of words to be stored by the main control equipment may become considerable. If for instance an exchange of 10,000 lines is considered where the calls rate is 1.5 BHC (Busy Hour Calls), where the incoming and outgoing traffic rates are both 0.05 E (Erlangs) and where the traffic of this 10,000 lines exchange towards distant exchanges represents 80% of the origin traffic, and if it is assumed that a word of the supervision equipment should on an average be memorized during two minutes, one may calculate that the total number of words necessitated by such a traffic will be of the order of 990 with a loss probability of 0.01. With a number of words for the supervision equipment of the order of 1000 and if the register words, which may be of the order of 100, are registered in common with the supervision words in a main control equipment and more particularly in a sequential access main memory, the minimum time of 16 milliseconds for two successive checks of the condition of the loop of a particular subscriber gives rise to a staticizing time for these various words, and in particular for the register words, which is smaller than 16 microseconds. But, as described in the aforementioned patent this staticizing time should preferably be higher, or at least equal to the sampling period which is generally of the order of 100 microseconds or more, as it is advantageous to choose the sampling frequency higher than twice the highest audio frequency to be transmitted, but as low as possible in order to be able to use the largest possible number of channels per highway.

Consequently, an object of the invention is to realize a control system for a communication network operating according to the time multiplex principle and comprising a main control equipment free of the above drawbacks.

According to a main characteristic of the invention, a control system of the type referred to at the beginning of the description comprises two main control equipments both cooperating with said slave control equipments, the function of the first main control equipment being to register data or words relating to communications being established and/or being interrupted, whereas the function of the second main control equipment is to register data or words relating to establish communications or to communications at least routed, the number of words able to be memorized in said first main control equipment being substantially smaller than the number of words able to be memorized in said second main control equipment, so that the distribution cycle of the words of said first main control equipment in the corresponding staticizing device has a period inferior to the cycle corresponding to said second main control equipment.

According to another characteristic of the invention, words or data staticized by said first and second main control equipments may be transferred wholly or partly from one staticizing device to the other by means of a buffer memory.

In this way, during a given staticizing time either for the first main control equipment comprising register data, or for the second main control equipment comprising supervision data, the staticized data or a part of the latter may be transferred towards the buffer memory which will be advantageously constituted by a set of bistable devices corresponding to those used to staticize the data delivered by the main memories. Also, from the bistable devices storing an information of the buffer memory, these data may be inscribed either in the staticizing device of the supervision equipment, or in the staticizing device of the register equipment, and this during the staticizing time allotted to data corresponding to the communication involved. Such a link device between the two main control equipments offers the advantage of realizing a full accessibility between the two equipments with a delay time which may be very limited. Even when using only a single buffer memory adapted for a bidirectional traffic, i.e. allowing the exchange of data between the first and the second main memory equipment either in one sense, or in another, and thus by using a single set of bistable storing devices which may only register a single word at once concerning a given communication, the transfer delay is very small. The average delay for any communication is much smaller than the cycle of the main supervision memory. The probability that a delay reaches almost two cycles of the supervision memory is only $P=0.001$. Therefrom it follows that the delays are considerably smaller than those which would be obtained if the accessibility between the two equipments of the main memory had been based on a stroboscopic method function of the ratio between the cycles corresponding to the two main control equipments.

Another object of the invention is to considerably simplify the connection between the main control equipments and the slave control equipments.

According to another characteristic of the invention, in a control system as characterized above, the cycle of the second main control equipment or supervision equipment, has a period which is at least equal to the product of the staticizing time of the words of this second equipment by the sum of words contained in said first and second equipment, an access device comprising gates being provided in common for the transmission of information towards said slave control equipments, either from the staticizing devices of said first main control equipment, or from the staticizing devices of said second main control equipment, the access from the second equipment being permitted during time intervals of the cycle of this second equipment corresponding to the staticizing of words of this second equipment whereas the access from said first equipment is authorized during the complementary time intervals of the periods of the cycle of said second equipment.

In this way, any access equipment towards the various slave control equipments may be used in common by the two main control equipments. The advantage of such an arrangement, particularly in a large telephone exchange, will be appreciated, if it is considered that there may be more than 200 slave control equipments, if it is considered that there is such an equipment at each end of one of the 100 highways each serving 100 subscribers, this without taking into account other slave control equipments used for particular controls. Highways have to be provided from the main control equipment towards each of these slave control equipments in order to be able to transmit data and in particular the number of a subscriber within this group; also data relating to the time channels used by the subscribers have to be transmitted in the way explained in the aforementioned patent and they have in particular to be routed towards one or more slave control equipments under the control of information delivered by the main control equipment and identifying this or these slave control equipments. Referring to the aforementioned patent, it will be realized that these transfers of information necessitate a considerable number of wires and electronic gates and that the time division multiplexing of the transfer of data from the first or the second main control equipments towards the slave control equipments permits a notable simplification.

According to this system, it is to be remarked that the first main control equipment, the register equipment, keeps the benefit of an own cycle the period of which is compatible namely with the correct detection of calling dial pulses. On the other hand, as there exists in general a ratio of one to ten between the durations of the cycles of the first and of the second main control equipments, the latter being used for the supervision, the increase of duration by 10% of the latter cycle is proportionally very small and does not constitute problems. Indeed, even with a supervision memory of 1000 words and a staticizing time of at least 100 microseconds for each of these words, the supervision cycle is of the order of 100 milliseconds and this period is sufficiently small to ensure an adequate supervision of a communication taking place.

As explained in the aforementioned patent, one may thus re-inscribe every 100 milliseconds in the slave control equipments associated to a given communication, the data permitting to unblock the corresponding speech gates, so that any eventual error in the control exercised on these gates by any slave control equipment will be automatically corrected after a maximum delay of the order of 100 milliseconds, this delay being extremely short so that there is no possibility of real disturbance in the communication.

Another object of the invention is to simplify the transfer of data between the second main control equipment, or the supervision equipment and the slave control equipments.

According to another characteristic of the invention, the odd and even cycles of said main control equipment are respectively used for the transfer of data or words staticized by said equipment respectively towards the slave control equipment(s) serving the calling subscriber, during the odd (even) cycles and towards the slave control equipment(s) serving the called subscriber during the even (odd) cycles.

In this way, the access period between the main supervision equipment and the slave control equipments associated to the highways, is doubled for a given communication, but as mentioned above, this time remains however sufficiently small so as to permit an entirely satisfactory supervision of a communication. However, the transfer of information is simplified, because the orders which are stored in the staticizing device of the main control equipment, as described in the aforementioned patent, may also be used in common for the calling subscriber and for the called subscriber. A same order may thus be effective during two consecutive supervision cycles, this order serving during the first cycle for the transfer of data relating to the calling subscriber and during the following cycle for the transfer of data relating to the called subscriber. Hence, there is also a time division multiplexing with respect to the data staticized in the main control equipment and relating either to the calling subscriber or to the called subscriber, which has also for effect to simplify the access equipment serving for the transfer of these data towards the slave control equipments.

The supervision equipment as well as the register equipment should have access to the slave control equipments associated to the highways in order to control the multiplex connections by sampling, either between subscribers or between a subscriber and signalling sources; these main control equipments should also be able to obtain data concerning as well the condition of a subscriber's line as of the subscriber's line as it is registered in a subscriber's lines memory. Indeed, this is necessary as well for the supervision equipment which has to detect the release of the communication, as for the register which should namely detect the openings of the subscriber's loop produced by the operation of the calling dial.

Still another object of the invention is to simplify the interconnections between the main control equipments and the subscriber's lines circuits as well as the memory of the subscriber's lines conditions.

According to still another characteristic of the invention, the control system provides an access device comprising gates used in common for the transmission of data from said main control equipments towards the subscriber's lines circuits and the circuits of the subscriber's lines conditions memory, as well as reciprocally for sending data from said line circuits and said memory circuits towards said main control equipments and more particularly towards the staticizing devices of said main control equipments, said access device being used in common for said main control equipments, each of the latter using only a predetermined fraction of its staticizing time for such data transmissions, the different staticizing time fractions allotted to the different main control equipments being distinct, for instance the first half of each staticizing time being reserved for the communications from and to said first main control equipment, while the second half of each staticizing time is reserved to the transmissions from and to said second main control equipment.

The above system also permits a considerable simplification of an access equipment, and contrary to the access system giving access in common towards the slave control equipments described above, each of these main control equipments and in particular the register, keeps an access towards the subscriber's lines circuits and the corresponding memories at its own rhythm. It is true that this conservation of the own rhythm for each main control equipment is obtained to the prejudice of a reduction in the time available for each communication, this time becoming smaller than the staticizing time, in particular the half of this time when the supervision equipment and the register equipment have a common access towards the line circuits and their memory. But particularly, if use is made of the system of the aforementioned patent in which the staticizing time is at least equal to a speech sampling period, the available time even by using a relatively slow logic, remains fully sufficient for a transfer of data during half a staticizing period.

The above mentioned and other objects and features of the invention will become more apparent and the invention itself will be best understood by referring to the following description of embodiments taken in conjunction with the accompanying drawings in which.

Figures 1, 3:
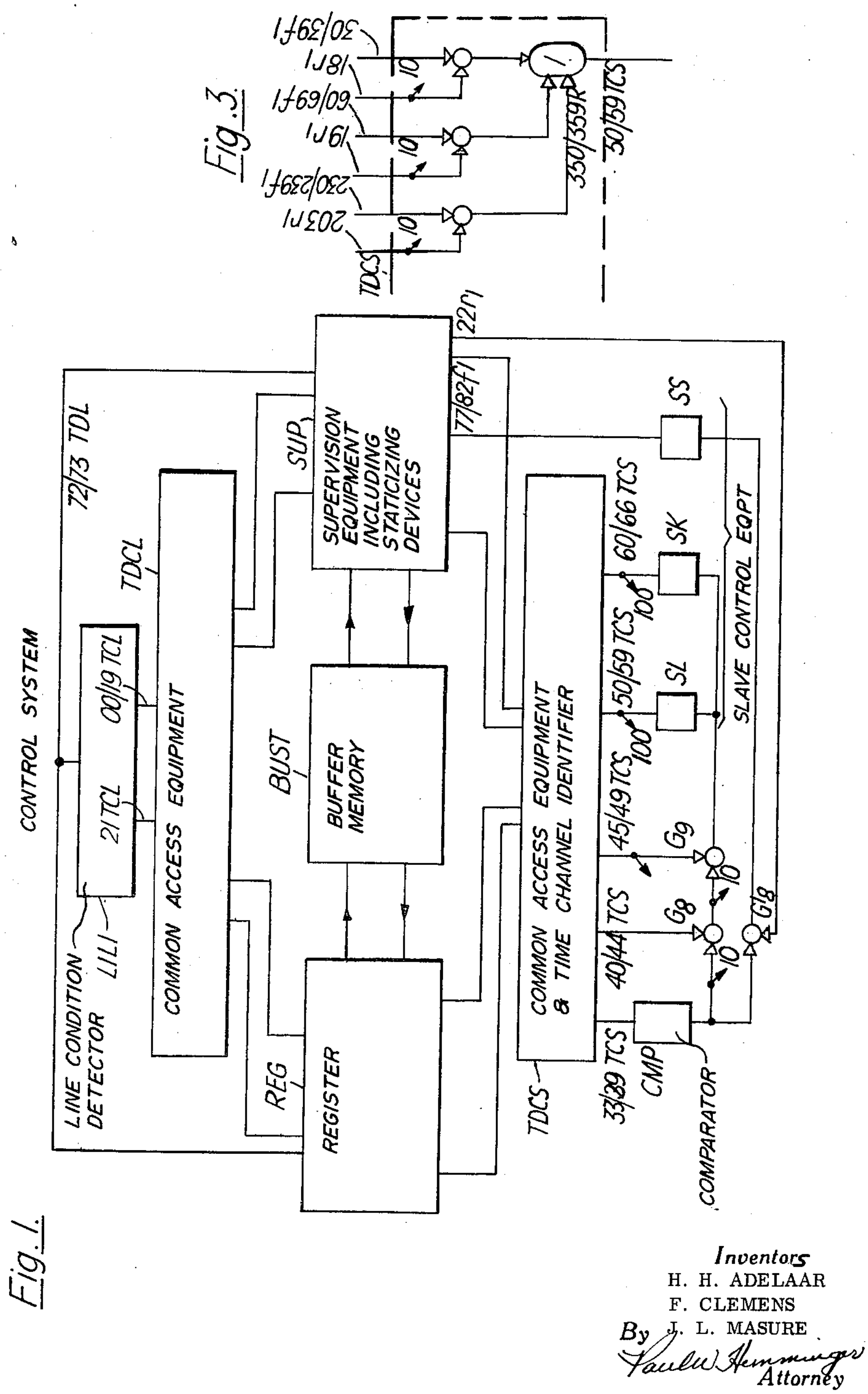
FIG. 1 represents the general arrangement of a control system according to the invention, comprising a supervision equipment and a register equipment which may have access to one another and which may also each have access to other circuits.
Figure 4:
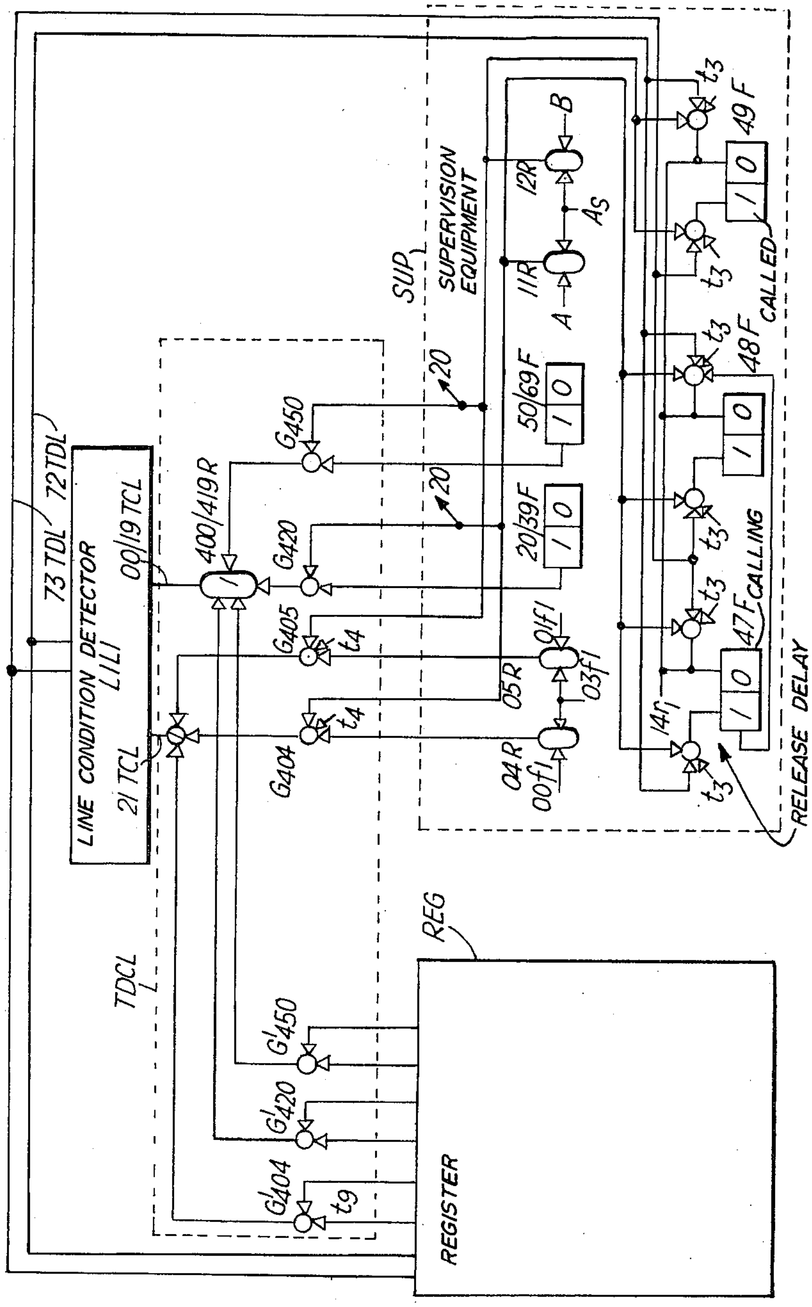

FIG. 3 illustrates the principle of an access equipment used in common by the supervision circuits and the register circuits to reach and control the slave control equipments associated to the highways; and FIG. 4 illustrates in more detail than FIG. 1, the principle of a common access equipment of the supervision circuits and of the register circuits towards the subscriber's lines circuits and the memories of the subscriber's lines condition.

FIG. 1 represents the assembly of control circuits in the form of functional blocks. It essentially comprises a first main control equipment constituted by the register REG and a second main control equipment constituted by the supervision circuit SUP. These two equipments are as indicated on FIG. 1 connected in the two senses with a buffer memory BUST. On the other hand, they are also connected by means of a common access equipment TDCS with the slave control equipments associated to the highways used in a telephone exchange operating according to the time division multiplex principle. These slave control equipments are indicated either by SL or by SK depending upon the fact that it concerns the control of electronic gates associated to the highway to reach the subscriber's circuits at voice frequency or else to reach another highway and particularly an intermediate highway used to connect two highways having a direct access to the subscriber's lines. The selection of these slave control equipment is accomplished by an assembly of electronic gates such as GS which receive a pulse from comparator CMP situated in the time channel used for communication, the identity of the time channel being also transmitted by TDCS.

The supervision equipments SUP and the register REG also have access towards a circuit LILI through a second common access equipment TDCL. This circuit LILI has itself access towards the subscriber's circuits so as to be able to check if the line of a subscriber is open or closed, and in its memory are moreover stored data concerning the latest registered state of the subscriber's lines condition, for instance rest condition, call requesting service, treated call, released communication.

The system will now be described in more detail by referring eventually to the various figures which however do not represent, even in a symbolic form, all the elements of the control circuits such as bistable trigger devices and AND or OR circuits, because as will be shown further, it is easier to define the working conditions of these bistable devices and the structure of these gates by logic equations, where the sign · represents the coincidence (AND) and the sign + the function OR, small letters corresponding to capital letters being used, as it is well known in relation with telephone relays, to identify an output signal from gates or bistables designed by capital letters.

As already mentioned, the supervision circuit constituting the second main control equipment comprises two essential parts the first of which is a sequential access memory comprising as many words as there are simultaneous conversations during the traffic peaks. In case of an exchange of 10,000 lines considered above, and by assuming a loss probability of $P=0.01$ for the supervision circuit, one will need for the considered traffic 990 words corresponding to as many memory rows. Apart this sequential access memory which is not represented on the figures, the second essential part of the supervision circuit is constituted by bistable devices fed by columns of the sequential access memory, as well as by logic circuits comprising namely coincidence gates which are associated to these bistable devices. This part of the supervision circuit is denoted by SUP in the form of a block represented on FIG. 1. Thus it constitutes the staticizing device of the memory as well as the logic part of the supervision circuit.

In order to be able to use an access device towards the slave control equipments associated to the highways, in common for the supervision circuit and for the register circuit constituting the first main control equipment, the supervision circuit cycle, i.e. the access switch cycle which activates successively and cyclically the different rows of the supervision memory under the control of a pulse generator, will comprise a number of time units equal to the sum of words of the supervision memory and of that of the register. Assuming that the number of words of the register is 90, the supervision cycle will thus have 1,080 time units, the time unit corresponding to the staticizing time in the examined part being equal to 120 microseconds i.e. higher than a sampling period of 100 microseconds of the multiplex system. As explained in the aforementioned patent, the 120 microseconds time period which gives access to any selected slave control equipment, from the supervision staticizing device, may also be used in a large measure for logic operations in the supervision equipment. This time period of 120 microseconds is divided into 12 consecutive intervals of 10 microseconds each, called $t_{0/11}$, the first of which $t_0$ is used for reading the coordinate memory and for staticizing in the bistables associated to the columns, and the last of which $t_{11}$ is used to re-inscribe the state of the staticizing bistables, which may eventually have been modified by logic operations, in the coordinate memory of the supervision equipment.

The different time units may be defined by a pulse source of 100 kilocycles which triggers a counter of 12 used as a distributor in order to produce the 12 series of pulses $t_{0/11}$ each having a period of 120 microseconds but phase shifted one with respect to the other. One of these pulse series of a period of 120 microseconds, for instance $t_0$, is then used to trigger a counter of 9 also acting as a distributor to produce 9 pulse series of pulses each having a duration of 120 microseconds and a period of 1.08 milliseconds. In the same way, by means of a counter of 10 a cycle of 10.8 milliseconds will be obtained and then, by means of a counter of 12, a cycle of 129.6 milliseconds will be obtained corresponding to $9\times10\times12=1080$ time units of 120 microseconds. One of the phase shifted pulses having a duration of 10.8 milliseconds and a period of 129.6 milliseconds thus corresponds to 90 time units of 120 microseconds which will hereinafter simply be called time units, and these 90 time units may be allotted to the register for the transfer of data towards the slave control equipments, while the remaining 990 time units will be effectively used by the access switch to successively materialize the 990 supervision words and to reach the slave control equipments from the supervision equipment.

If the number of rows of the coordinate supervision memory corresponds to the possible number of simultaneous conversations, the number of columns of this memory will correspond to the number of data contained in each word, i.e. for binary registrations to the number of binary digits of data. For a large telephone exchange of 10,000 lines provided with the usual facilities, the number of binary digits of each word characterizing a given communication taking place may be of the order of 100 and this digit also repreesnts the number of bistables contained in the equipment SUP.

It will be recalled that these bistable devices are brought in the corresponding state established in the coordinate memory during the interval $t_0$ of the staticizing interval of 120 microseconds, while the re-inscription is done during the interval $t_{11}$ of the time unit the bistable being always reset to its 0-condition at the end of $t_{11}$ under the control of the logic circuit associated to these bistables and contained in SUP.

Figure 2:
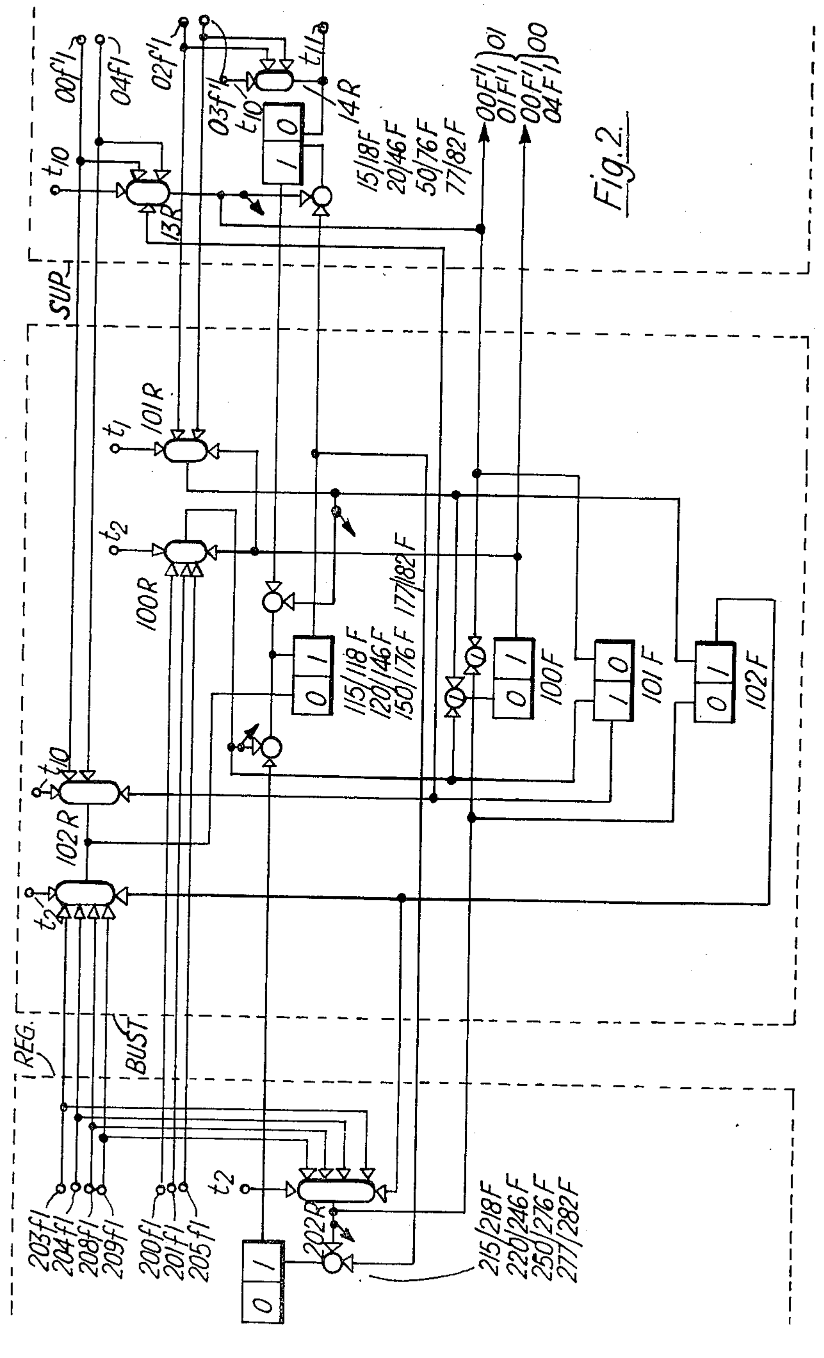
FIG. 2 represents in more detail than FIG. 1, the connections which may be realized between the supervision equipment and the register equipment by means of a buffer memory.

In order to precise the operation of the circuit, the different bistables a part of which is represented on FIG. 2, will first of all be enumerated, in a symbolic form. The bistables which in the first instance are fed by the column reading circuits are numbered from 00F and in the present description a total of 75 bistables is used numbered as follows.

00F to 04F constitute five bistables materializing the sequential orders S0 which will be translated by the corresponding logic operations. The bistables 00F to 04F are used according to a two-out-of-five-code permitting ten sequential orders of which seven are used. The sequential order 00 corresponds to 00F1.04$f$1 which is a symbolic notation for the bistables 00F and 04F in the 1-condition whereas the three other bistables of S0 are in the 0-condition. This order 00 indicates that the row of the corresponding supervision memory is free. This temporarily staticized indication of row availability may be given to the buffer memory BUST so that an information contained in this memory (FIG. 1) and delivered by the register REG, may be transmitted in SUP.

The second sequential order 01 corresponds to $$00f1.01f=01r1$$

This equality is used to indicate that there is a coincidence gate terminating in a regenerator 01R which provides an active signal when the bistables 00F and 01F are simultaneously in their 1-condition. The logic circuits triggering the inputs of the different bistables may be controlled either directly from a combination of two bistables 00F/04F or from a corresponding regenerator such as 01R. This sequential order 01 translates the signalling condition which controls the transfer of data towards the slave control equipments.

It will first of all be assumed that the register REG controls the establishment of a communication until the equipment number and the time channel of the calling line and the called line are available, as well as the identity of the intermediate storing device of speed pulses in the case of intragroup communications and finally, the class of the call.

It will be recalled here by referring to the U.S. patent application S.N. 63,203, filed October 17, 1960 (H. Adelaar) as well as to the aforementioned patent, that a time division communication system to which the present invention may be applied, may comprise a highway diagram for an exchange of 10,000 lines providing 100 group highways each serving 100 subscribers. These highways are associated per groups of 10 to form a supergroup and this association is realized by means of an intermediate highway per supergroup which, by means of 10 gates, may have access to any of the 10 group highways. Moreover, other intermediate highways are provided to form any combination of two supergroups, so that these intermediate highways have access to any of the 20 group highways by means of 20 corresponding gates. Hence there are $$10+\binom{10}{2}=55$$

$$\text{or } 10+\frac{10!}{2!8!}=10+45=55$$

intermediate highways and each communication between two subscribers is established by means of corresponding group highways connected by the intermediate highway corresponding to these two highways; each communication thus passes in cascade through four gates which are unblocked simultaneously due to an alinement of channels already described and in particular in the U.S. Patent 3,158,689 (J. Masure). This method permits intra-supergroup or inter-supergroup connections according to the fact that the subscribers pertain to the same supergroup or not. However, in case of intra-group communications, i.e., when the subscribers also pertain to the same group and are thus connected by their subscriber's gates to an end of the same group highway, it is advantageous in a system where communications are transmitted by the principle of resonant transfer circuits described namely in the U.S. Patent 3,073,903 (K. Cattermole et al.) to use the principle known as intermediate storage and which is described in the Belgian Patents Nos. 558,096 (E. Wright—W. Bezdel) and 558,097 (W. Bezdel). In this case, use is made not of a same time channel on the three highways intervening in an intergroup communication, but of two distinct time channels on the highway serving the group where the two subscribers are to be interconnected, as well as on an intermediate intra-group highway. This intermediate intra-group highway has access by means of 100 gates to each of the 100 group highways and also by means of the 12 gates to intermediate storing devices mainly constituted by condensers. These twelve intermediate storing devices correspond to a 25 channel multiplex system, for instance of 4 microseconds each, which thus permits to any 12 intra-group communications to be established simultaneously on the intermediate intra-group highway each time by means of two distinct time channels.

The number of the calling line equipment will be materialized by the identity of the supergroup SGG, of the group GG, of the tens digit TG and of the units digit UG of the calling subscriber as described in the aforementioned patent.

The number of the called subscriber's equipment is identified in the same manner.

The four bistable devices 15F and 18F are used to characterize the class of the call and in particular, in view of the preceding explanations, if it concerns an inter-group call or an intra-group call, or a called line which has been found to be occupied by the register or still a line for which the supervision equipment has to take care to send a special busy tone to the calling subscriber to inform him that the communication may be established. The latter eventuality will namely happen when it is no longer possible to obtain an alined channel for the inter-group communication or two alined channels for an intra-group communication. These four bistable devices may be used according to a two-out-of-four code to define six classes of calls of which the four mentioned above are used in the present description.

The 20 bistable devices 20F to 39F are used per group of 5 to characterize the four digits of the equipment number of the calling subscriber according to four two-out-of-five codes, i.e., 20F to 24F for the thousands digit or the supergroup SGG, 25F to 29F for the hundreds digit or the group GG, etc.

The seven bistable devices 40F to 46F are used to characterize the time channel used by the calling subscriber and this according to a three-out-of-seven code permitting 35 combinations of which 25 are used to characterize the 25 possible channels.

The three bistable devices 47F to 49F are used to realize the supervision itself during the conversation. The bistables 47F and 48F are used to supervise the condition of the calling subscriber's loop while the bistable 49F gives the state of the called subscriber's loop.

The 27 bistable devices 50F to 76F respectively correspond to the 27 bistables 20F to 46F but give the corresponding information for the called subscriber, i.e. the four digits of its equipment number as well as its time channel, which during an inter-group conversation will be the same as that of the calling subscriber.

The six bistable devices 77F to 82F give, according to a two-out-of-six code offering twelve possibilities, the identity of one among the 12 intermediate storing devices, this device being used in the particular case of an intra-group communication.

Finally, the three bistable devices 84F to 86F which complete the series of 75 used for the supervision memory, are provided to constitute a counting circuit in the form of a binary counter, this counting circuit being fed by a pulse source so that the condition of the binary counter may be advanced by one step during some appearances of the word corresponding to a communication in the staticizing device SUP. This counting device is mainly used as soon as one has detected that one of the subscribers has released, so that if the other subscriber has not released after a certain time, the communication will be interrupted under the control of this counter operating as a timing circuit.

The essential functions of the series of 75 bistable devices of the supervision equipment having been described above, the essential functions of the different regenerators 01R to 35R will now be described, these regenerators being essentially devices defining the logic functions and being constituted by coincident gate assemblies the respective outputs of which are mixed, the common output level being amplified and established at a suitable value by the regenerator.

The function of the six regenerators 01R to 06R is to transfer the sequential order S0 established in two-out-of-five code to the bistables 00F/04F. Regenerator 01R corresponds to the logic equation:

$$01R = 00f1.01f1$$

This indicates thus that regenerator 01R provides an active signal 01r1 at its output when the bistables 00F and 01F′ are simultaneously in their condition 1, the sequential signalling order 01 following the sequential order 00 corresponding to a supervision row which is free. For the following orders one may write:

Start of conversation: $02R = 00f'1.02f'1$
Conversation: $03R = 01f'1.02f'1$
Release of the calling subscriber: $04R = 00f'1.03f'1$
Release of the called subscriber: $05R = 01f'1.03f'1$
Transfer to the register: $06R = 02f'1.03f'1$ Regenerator 10R is defined by:

$$10R = 84f1.85f1.86f'1$$

This regenerator thus produces a signal when the counting circuit constituted by the binary counter 84F/86F has done eight steps. The corresponding signal 10r1 is namely used to modify a sequential order.

The regenerators 11R and 12R are used to authorize the transfer of data characterizing either the calling subscriber, or the called subscriber and under the control of particular sequential orders S0, towards the access network TDCL (FIG. 1) permitting to reach the subscribers' line circuits, as well as a memory of the state of the subscribers' lines. If the subscribers' line circuit indicates that the loop is open, whereas the subscribers' line memory circuit indicates a rest condition of the subscriber considered, these two data correspond to an inactive subscriber. When the subscriber's loop is closed, although its line memory is at the same rest condition, it concerns a subscriber who is calling. For the same closed condition of the subscriber's loop but with the corresponding line memory in the active condition, it concerns a subscriber in conversation or at least one of which the call has been detected. Finally, for this same active condition of the subscribers' line memory but coincident with an open loop, this fourth state corresponds to a subscriber which has just hung up the receiver.

In order to be able to use an access network towards the subscriber's line circuits and towards the subscriber's line memories which is common to several equipments and in particular to the second main control equipment constituted by the supervision circuit and the first main control equipment constituted by the register circuit, the time unit of 120 microseconds is divided into a first part of 60 microseconds during which the supervision data may be sent to this access network. On the other hand, during the second part of the time unit, the interval of 60 microseconds is reserved for the transmission of data between the register and the subscriber's line circuits. This time multiplexing leaves an interval of 60 microseconds which is sufficient for the transfer of data. On the other hand, during the even cycles of the supervision equipment only the data concerning the calling line are transmitted from the supervision circuit, while during the odd cycles, data relating to the called subscriber is transmitted. The regenerator 11R (FIG. 4) authorizes in this way the transmission of data from the supervision circuit and relative to the calling subscriber towards the line circuit and the corresponding line memory, whereas the regenerator 12R (FIG. 4) authorizes the same transmission in the case of called subscribers.

The regenerator 13R is used to authorize the transmission, and more particularly the arrival of data stored in the buffer memory BUST. Regenerator 13R is defined by:

$$13R = 00f1.04f1.101f1.t_{10}$$

This regenerator 13R is thus activated when the sequential order indicates that the row now staticized by SUP is free, while on the other hand, the signal 101f1 is given by a bistable 101F shown at FIG. 2 as being part of BUST and indicating that this buffer memory is ready to make a transfer of data towards the supervision equipment SUP. The transfer itself will take place during the time interval $t_{10}$. Regenerator 13R is moreover shown on FIG. 2 as being part of SUP and it is represented in the form of a coincidence gate activated by the signals defined by the above logic equation. Such equations thus completely define the operation of the circuit and for this reason, some regenerators or bistable circuits the operation of which may be defined by such equations, have not been represented on the drawings.

Regenerator 14R is defined by:

$$14R = t_{11} + 02f'1.03f'1.t_{10}$$

This regenerator is thus activated by the sequential order 06 corresponding to a transfer of data towards the register or at the end of each time interval, $t_{11}$, i.e. at the end of each time unit of 120 microseconds. This regenerator will thus also be used for the resetting to 0 some bistables and in particular the supervision bistables themselves i.e. 47F/49F.

Regenerator 16r is defined by:

$$00f1.01f'1.15f1(16f1+17f1)+01f'1.02f'1.48f1.49f0 +00f1.03f'1.48f0.49f1$$

It thus produces a signal under the control of different sequential orders and bistables determining the class of call as well as those used for the supervision itself. This regenerator 16R produces an active signal 16r1 as defined above and also a complementary signal 16r0 corresponding to the inverse of the logic proposition established above. The signal 16r0 is used particularly for the resetting to 0 the binary counter 84f/86f.

Regenerator 17R is defined by:

$$17R = 01f'1.02f'1.48f0.t_{10}.T4+ 00f1.03f'1.48f0.49f.t_{10}.T4+ 00f1.01f'1.15f1.(16f1+17f1)t_{10}.T1\tfrac{1}{4}$$

equation in which T4 and T¼ are pulses controlling the advancement of counter 84/86F. They have each a duration of a supervision cycle, but the first has a period of 32 cycles, i.e. about 4 seconds whereas the second has a period of 2 cycles, i.e. about ¼ second.

The use of the above parentheses has solely for object to simplify the notation and to avoid the repetition of signals which are used to control several coincidence gates the outputs of which are mixed with each other. The main function of this regenerator 17R is to control the advancement of the release counter 84F/86F.

The 11 regenerators 18R to 28R are used for the authorization of different transfers of data from the supervision memory towards the slave control equipments associated to the different highways, i.e. the subscribers' highways, the intermediate highways, the intermediate intra-group highway and the signalling highways.

These regenerators produce pulses in coincidence with different pulse combinations which will be characterized below by corresponding logic equations. Besides signals which will be identified below, one may note that all these regenerators will only produce their pulses during the 110 last microseconds of the time unit of 120 microseconds, in order to make sure that the bistables triggered by the supervision memory column reading circuits will have had time to stabilize themselves in a well determined condition during the first 10 microseconds, the remaining part of the time unit being still larger than the sampling period of 100 microseconds in order to permit these transfers in the manner explained in the aforementioned patent.

The regenerators 18R and 19R are respectively characterized by:

$$18R = A.Ts.(01+02+03)$$
$$19R = B.Ts.(01+02+03)$$

where 01, 02 and 03 denote the corresponding sequence orders, i.e. that 01 for instance corresponds to two bistables 00F and 01F being in their 1-condition (signalling order), etc. Pulse Ts mentioned above is a pulse having the supervision cycle period, i.e. 129.6 milliseconds and having a duration coresponding to the time interval during which the supervision words are read, i.e. $^{11}/_{12}$ of this supervision cycle period or 118.8 milliseconds, the remaining 10.8 milliseconds being reserved for transfers from the register REG towards the slave control equipments as already explained above. Pulses A and B are square pulses having both a period equal to two supervision cycles, pulse A authorizing during the "even" supervision cycles the transfer of data relating to the calling subscriber, while pulse B authorizes during the "odd" supervision cycles the transfer of information relating to the called subscriber. The regenerators 18R and 19R are used respectively to authorize the transfer of the line identities inside their group of 100 of calling and called subscribers towards the slave control equipments.

Regenerators 20R and 21R are defined by:

$$20R=A.Ts.(01+02+03+04+05)$$
$$21R=B.Ts.(01+02+03+04+05)$$

These regenerators authorize the transmission of signals identifying respectively the slave control equipments associated to the highway of calling and called subscribers, i.e. their supergroup, their group and their time channel.

Regenerator 22R is defined by:

$$22R=Ts.(01+02+03+04+05)$$
$$21R=B.Ts.(01+02+03+04+05)$$

These regenerators authorize the transmission of signals identifying respectively the slave control equipments associated to the highway of calling and called subscribers, i.e. their supergroup, their group and their time channel.

Regenerator 22R is defined by:

$$22R=Ts.15f1.17f1(02+03+04+05)$$

It is used to control the selection of the slave control equipment associated to the intra-group intermediate highway going towards the intermediate speech storage devices.

Regenerator 23R is defined by:

$$23R=Ts.15f1.01(16f1+17f1).(INTR+86f'0)$$

which thus indicates that it groups the outputs of four coincidence gates. This regenerator is namely used to authorize the transfer of the identity of the slave control equipment associated to the signalling highways which may have access to all the group highways and which on the other hand are respectively connected to calling and calling tone current sources.

Regenerators 24R and 25R are defined by:

$$24R=A.Ts.15f1.16f1(02+03)$$
$$25R=B.Ts.15f1.16f1(02+03)$$

which indicate that it concerns authorizations of the transfer of the identity of the intermediate highway used for an intergroup communication. During time A 24R will authorize the transfer towards the slave control equipment associated to the highway of the calling subscriber, while during time B 25R will authorize the transfer towards the slave control equipment associated to the called subscriber's highway. These data will in fact respectively be constituted by the identity of the supergroup of the called and calling subscriber.

Regenerator 26R is defined by:

$$26R=Ts.15f1.17f1(02+03)$$

which indicates that it concerns authorizations of the transfer of identity of the slave control equipment associated to the intra-group intermediate highway and this respectively for the calling and called subscriber. Indeed, on this sole intra-group intermediate highway used for such calls between two subscribers of the same group, two distinct time channels are used on this intermediate highway as well as on the highway of the group of the two subscribers, respectively for the calling and called subscriber.

Regenerators 27R and 28R are defined by:

$$27R=A.Ts.T\tfrac{1}{2}.16f1.17f1.01$$
$$28R=A.Ts.T1.15f1.18f1.01$$

in which T½ and T1 define the pulses corresponding to busy tones, the first being a pulse having a period equal to four times the supervision cycle, i.e. nearly a half second and a duration of a supervision cycle, whereas the second has the same duration but a period equal to eight supervision cycles, i.e. somewhat more than a second. This first pulse characterizes the rhythm of the well known busy tone, while the second characterizes a tone indicating that the called subscriber cannot be reached due to an all equipments or paths busy condition—as, for instance, when it is not possible to obtain a channel alinement on the three highways being used for an intergroup communication.

These regenerators 27R and 28R are used respectively to authorize the transfer of identity of the special intermediate highways which are used one to connect any of the subscriber's highways to the busy tone source and the other to the special tone source, the pulses T½ and T1 thus defining the transmission rhythm of these tones.

Finally, regenerators 30R to 35R are used to authorize the transfer of data identifying the intermediate speech storage device. These devices are 12 in total as already explained and their identity is defined by the bistables 77F to 82F according to a two-out-of-six code. These regenerators 30R to 35R are thus each controlled by the corresponding bistable in its 1-condition as well as by the authorization 26r1 coming from regenerator 26R. This transfer of data is particular to the supervision equipment and is carried out as shown in FIG. 1 directly from the equipment SUP to the slave control equipment SS associated to the intragroup intermediate highway in order to control the gates giving access to the twelve intermediate speech storage devices.

It will now be defined how the different bistables are operated, with the exception of the operations outgoing from the column reading circuits of the supervision coordinate memory.

With respect to the four bistables 00F to 03F which are used to define the sequence orders according to a two-out-of-five code (with moreover 04F) it will first of all be remarked that they are duplicated, the bistable devices 00F to 003F being only set in their 1-condition by the eventual column pulses of the coordinate memory. On the other hand, these bistables 00F to 003F are reset to their 0-condition by the pulse $t_{11}$, i.e. they start basculating towards their 0-condition at the end of the pulse $t_{11}$. Hence, the above bistable devices directly controlled by the coordinate memory are used to authorize the transfer operations of data towards the slave control equipments. Also, these four bistable devices are used, together with 04F, to define the sequence orders 00 to 06. These four bistable devices 00F to 03F are duplicated by four corresponding bistable devices 00F' to 03F' which themselves are eventually reset to their 0-condition due to the pulse $t_{10}$, so that their new condition determined by the logic of the supervision circuit is available during $t_{11}$ so that it may be reinscribed in the cordinate memory. The resetting to their 0-condition of the bistable devices by $t_{10}$ may also be realized for most of the other bistable devices of the supervision circuit when it is desired to reinscribe this condition in the coordinate memory.

This is the reason why the duplicating of the bistable devices 00F to 03F is necessary; these bistable devices controlling the transfer of data towards the slave control equipments would no longer have a sufficient time for the transfer towards the slave control equipments.

This might cause partial modifications of the data in these equipments, which modifications might only be corrected one cycle later. With the present arrangement, the bistable devices 00F to 03F, as well as 0.4F which is also reset to its 0-condition by $t_{11}$, are stable during 110 microseconds to authorize a transfer towards the slave control equipments.

On the other hand, the bistable devices 00F′ to 03F′ will only be used for logic operations, i.e. their two inputs used for setting them in the 0-condition and 1-conditions respectively, will be triggered by various signal combinations which will be detailed hereafter, while their outputs will namely be used to realize the re-inscription in the coordinate memory, this re-inscription being not described here. In this way it will become clear that any modification of the state of a bistable device such as 00F′ by the end of $t_{10}$ will only be copied by the corresponding bistable device 00F at the next staticizing of the word, i.e. after a supervision cycle.

For the same reason, the bistable device 86F is provided with an auxiliary bistable device 86F′ which is the one triggered by the logic of the supervision circuit, 86F being only triggered by the column reading circuit to be set in its 1-condition at $t_0$ and to be set in its 0-condition by the end of pulse $t_{11}$. It will be recalled that these bistable devices are part of the binary counter used to time a release delay either of the calling subscriber of the called subscriber.

The inputs of the different bistable devices will be defined for instance for the bistable device 00F′ by 00F′0 or 00F′1 depending upon the fact that it concerns the input setting the bistable device in its 0-condition or 1-condition, the output signals corresponding to these two conditions being of course identified by 00F′0 and 00$f$′1.

The input signals triggering the sequence order bistable devices 00F′ to 03F′ and 04F are identified by $$00F'0=t_{11}+t_{10}.4r1.(10r1+20r1.49f0)+t_{10}.AMA.02r1$$
$$00F'1=t_1.00F1+t_{10}.03r1.(10r1.48f0)+t_{10}.\underline{100f1}.06r1$$
$$01F'0=t_{11}+t_{10}.01r1.(48f0+48f1.49f1)$$
$$+t_{10}.03r1.(10r1+48f0)+t_{10}.05r1.21r1$$
$$01F'1=t_1.01f1+13r1+t_{10}.\underline{AMA}.02r1$$
$$+t_{10}.04r1.(10r1+20r1.49f0)$$
$$02F'0=t_{11}+t_{10}.03r1.(10r1+49f0)$$
$$+t_{10}.\underline{100f1}.06r1$$
$$02F'1=t_1.02f1+t_{10}.05r1.21r1$$
$$+t_{10}.01r1.48f1.49f1$$
$$03F'0=t_{11}+t_{10}.\underline{100f1}.06r1$$
$$03F'1=t_1.03f1+t_{10}.03r1.(10r1+48f0)+t_{10}.01r1.48f0$$
$$04F0=t_{11}+13r1$$
$$04F1=t_{10}.\underline{100f1}.06r1$$

In the preceding logic equations, all the signals have already been identified with the exception of some delivered by other circuits than the supervision equipment and which have been underlined. In particular, signal AMA is delivered by the automatic bookkeeping equipment of the communications and authorizes the supervision equipment to transfer the equipment number of the calling line towards the automatic bookkeeping circuit of the communications. As indicated by the preceding equations, this is realized during the sequence order 02 corresponding to the start of conversation, i.e. the sequence order characterized by the bistable devices 00F and 02F being both in their 1-condition. As indicated by the above equations, signal AMA will have for effect at the end of time $t_{10}$ to reset bistable device 00F to its 0-condition and on the other hand to trigger the bistable device 01F in its 1-condition. It results therefrom that during the re-inscription time $t_{11}$ of the information considered the bistable devices 01F′ and 02F′, in the coordinate memory of the supervision circuit, will now be memorized as being both in the 1-condition. In this way, one supervision cycle later, at the moment this word will be read, the bistable devices 01F and 02F directly triggered by the column reading circuits of the coordinate memory, will be in the 1-condition thus giving the sequence order 03 corresponding to the conversation condition.

The other signal in the preceding equations delivered by another circuit than the supervision equipment, is 100$f$1 which, as indicated on FIG. 2, is delivered by the memory BUST and corresponds to the bistable device 100F being in its 1-condition. This condition of this bistable device characterizes the availability of this buffer memory. For instance, as indicated by the last of the above equations giving the signal towards the input 1 of bistable device 04F, during the sequence order 06 which corresponds to the transfer of data from the supervision circuit towards the register circuit via the buffer memory, and more precisely at the end of pulse $t_{10}$, if this buffer memory BUST is really free, the corresponding signal 100$f$1 will trigger bistable device 04F in its 1-condition. On the other hand, the above equations indicate that the bistable device 00F′ will also be triggered in its 1-condition, and that on the other hand the bistable devices 02F′ and 03F′ will be reset to their 0-condition. In this way, the sequence order 06 is replaced by the sequence order 00 for the re-inscription in the coordinate memory of the supervision circuit. At the next supervision circuit, it will thus be this sequence order 00 indicating the availability of the corresponding row of the supervision memory which will be obtained, so that this row might be seized from the buffer memory. As shown on FIG. 2, while the sequence order 06 was effective, and more precisely at the end of pulse $t_1$, the state of the supervision bistable devices, i.e. 15/18F, 20/46F, 50/76F and 77/82F has been transferred to the corresponding bistable device of the buffer memory BUST, i.e. bistable devices 115/118F, 120/146F, 150/176F and 177/182F, these transfer operations having been authorized by regenerator 101R part of BUST.

The mode of operation of the bistable devices defining the sequence orders having been explained, by referring again to FIG. 2, it will easily be seen how the bistable devices of the supervision circuit are operated immediately above in connection with the transfer operations of their condition towards the buffer memory in order to be transferred back to the register, the corresponding supervision row being freed.

The reciprocal transfer from the corresponding bistable devices of the buffer memory BUST is realized at the end of time $t_{10}$ by the authorization of regenerator 13R of the supervision equipment as shown on FIG. 2, in which all the circles or other curved circumferences indicate coincidence gates coupled either to bistable inputs or other gates, except when a 1 is inscribed in these circumferences, in which case it concerns a mixer avoiding feedbacks. On the other hand, FIG. 2 also shows that resetting the different supervision bistable devices shown on this figure to their 0-condition may be effected by regenerator 14R, i.e. during the sequence order 06, when the corresponding row of the supervision memory is freed. This regenerator also provides pulse $t_{11}$ in order to reset these bistable devices automatically to their 0-condition after the re-inscription in the coordinate memory, this permitting the reading on a wire.

The operation of the two supervision bistable groups is still to be defined, i.e. 47/49F constituting the supervision bistable devices themselves and 84/86F constituting the binary counter controlling the release of a subscriber after the other has released.

The circuit controlling the operation of the bistable devices 47/49F is shown on FIG. 4 which particularly illustrates the transfer of data either from the supervision equipment or from the register towards the subscriber's line and memory circuits of the subscriber's line condition LILI. This supervision circuit operates in the following manner. For a given conversation, during the first half of the staticizing time unit reserved for this conversation, the pulse A or B thus having a duration of 60 microseconds and a period of 120 microseconds, activates either regenerator 11R or regenerator 12R depending upon the fact that it concerns an even supervision cycle defined by pulse A or an odd supervision cycle defined by pulse B. As shown on FIG. 4, regenerator 11R gives its authorization to circuit TDCL which is a transfer of data circuit or access network used in common by more than one main equipment, and in particular by the supervision equipment SUP and by the register REG. On the other hand, the 1-conditions of the bistable devices 20/39F and 50/69F characterizing respectively the number of the calling subscriber and the number of the called subscriber are also sent towards these transfer circuits TDCL. Each of the 1-outputs of a bistable device characterizing the number of the calling line may be authorized by regenerator 11R, while for the bistable devices characterizing the number of the called subscriber, this transfer authorization is given by the regenerator 12R. The multipling arrows numbered 20 at the outputs of these two regenerators indicate that these outputs are of course multipled towards each of the respective 20 bistable devices.

In this way, during the even and odd cycles of the supervision equipment, the latter equipment may alternatively transmit the identity of the calling or called subscriber depending upon the parity of the cycle. The regenerators 400/419R thus provide on the twenty corresponding collector wires 00/19TCL coupled to the circuit LILI the identity of the number of the calling or called subscriber. Without any interference with this transfer, the register REG may also transmit by means of these same regenerators to the circuit TDCL, as shown on FIG. 4, either the identity of the calling subscriber or alternatively the identity of the called subscriber, the 20 gates such as G'420 or G'450 being only able to be in opposite conditions under a control (not shown) analogous to that used in the supervision circuit SUP. Indeed, for the transfer of data from the register REG towards the line and storage circuits of the line condition LILI, the second half of the staticizing time unit is used. In this way, register REG may have access to the circuit LILI at its own rhythm which covers a period of 10.8 milliseconds. As previously explained, this rhythm which is quicker than that of the supervision equipment SUP defined by a period of 129.6 milliseconds, permits the register to examine the line condition of the subscriber with a sufficient rapid periodicity to note the interruptions produced by the dial and characterizing the called subscriber's digits.

In this way, the regenerators 400/419R of the transfer circuit TDCL will permit to send on the twenty wires 00/19TCL coupled with the circuit LILI, data characterizing either the calling subscriber's number or the called subscriber's number and this either from the circuit SUP or from the circuit REG, these circuits operating at different rhythms. The circuit LILI receiving the identity of the line may in return transmit data relating to the condition of this line, and more particularly to the condition of the subscriber's loop and to the condition of the bistable device in which was previously stored the last revealed condition of the subscriber's line. Via the wires 72/73TDL, the circuit LILI will thus be able to transmit these data either to the circuit SUP, or to the circuit REG, these wires being multipled towards these two circuits. An active signal will appear on wire 72TDL if the subscriber's loop is open while the corresponding memory for this subscriber indicates that he is in communication. An active signal on line 73TDL will correspond to a closed subscriber's line while the condition of the line is also registered as calling. In the latter case the subscriber is in communication.

If during the half time unit affected to a communication given by the supervision memory, in response to the identity of a line authorized by regenerator 11R or 12R, a signal is received on wire 72TD and if it concerns the calling subscriber, regenerator 11R as shown on FIG. 4 will authorize the passage of a pulse $t_3$ towards the 1-input of bistable device 47F which will thus be set in its 1-condition. However, if two supervision cycles later the new check of the line condition reveals that the loop of this calling subscriber is again open, the signal on wire 73RDL will on the other hand authorize the passage of a pulse $t_3$ towards the 0-input of bistable device 47F which will thus be reset to its 0-condition. This system thus permits to avoid that short interruptions of the calling subscriber's line might cause the release of conversation, for instance if the calling subscriber plays with the cradle or the dial.

If on the other hand the opening of the calling subscriber's line exceeds two supervision periods, i.e. $\pm 260$ milliseconds, at the second check of the loop, after 47F has been trigged in its 1-condition, the second appearance of the signal on 72TDL will permit the passage of pulse $t_3$ towards the 0-input of the second supervision bistable device 48F, particularly under the control of $47f1$. But this bistable device 48F will have been triggered in its 1-condition by a pulse $t_3$ as soon as a signal appears on 73TDL when the calling subscriber will have taken off the receiver and that this will have been detected by the supervision equipment. Consequently, during a conversation, 48F is in its 1-condition to characterize the fact that the calling subscriber is in conversation and will only be reset to its 0-condition, due to an opening of the calling subscriber's loop during a sufficient long time, in order to initiate the release of the connection.

The bistable device 49F is controlled in an identical manner as bistable device 47F, but now under the control of the called subscriber, i.e. during the odd cycles of the supervision equipment under the control of regenerator 12R. This bistable device 49F will thus be reset to its 0-position in a time which may not exceed 260 milliseconds after the release of the called subscriber.

The last group of supervision bistable devices i.e. 84/86F constitutes a binary counter which is fed by pulses T4, by means of regenerator 17R, as soon as either the calling subscriber or the called subscriber releases, as indicated by the resetting to 0 of the corresponding supervision bistable device 48F or 49F, the loop of the other subscriber remaining closed. These pulses T4 have a duration equal to a supervision cycle and a period equal to 32 supervision cycles, i.e. it concerns pulses having a period of about 4 seconds, which are conveniently obtained by means of a binary counter constituted by five scale-of-two counters fed by pulses having the period of the supervision cycle. The binary counter constituted by 84/86F will thus reach its eighth position, when its three bistable devices will be in their 1-condition, as characterized by regenerator 10R, after $7\times4=28$ seconds. As will be explained further, after this time delay, one might thus use this signal to cause a forced release either of the called subscriber or of the calling subscriber. If the subscriber which had not yet released releases during this time interval of 28 seconds, the absence of a signal at the output of regenerator 16R, i.e. a complementary signal $16r0$, will be used for resetting the three bistable devices 84/86F to their 0-condition.

The logic equations defining the operation of these three bistable devices are the following:

$$84F0=14r1+t_{10}.16r0+17r1.84f1$$
$$84F1=17r1.84f0$$
$$85F0=14r1+t_{10}.16r0+17r1.84f1.85f1$$
$$85F1=17r1.84f1.85f0$$
$$86F'0=14r1+t_{10}.16r0$$
$$86F'0=14r1+t_{10}.16r0$$
$$86F'1=t_1.86f1+17r1.84f1.85f1.86f0.$$

Therein the operation of a three-stage binary switch is recognized, under the control of advancing pulses produced by regenerator 17R. It will also be remarked that the equations defining the operation of bistable device 86F are in fact given with respect to bistable device 86F' which is a helping bistable device to bistable device 86F which is the one directly operated from the column circuits of the coordinate memory. The reason for this duplicating is exactly the same as that previously explained in detail for the bistable devices 00/03F used for the sequence orders.

One will now describe the different operations which are produced under the control of the different sequence orders 00/06.

The sequence order 00 characterizes a free row of the supervision memory, and this order corresponds to bistable devices 00′F and 04F both being in their 1-condition; FIG. 2 indicates that regenerator 13R will admit during pulse $t_{10}$ data being eventually stored in the buffer memory BUST.

Without describing the operation of register REG in detail, it should however be noted that the latter controls the establishment of the communication until the following data are available:

The class of call as determined by bistable devices 215/218F (FIG. 2). The equipment number and the calling line channel as determined by bistable devices 220/246F.

The same information relative to the called subscriber as determined by bistable devices 250/276F.

The identity of the speech storage device used for intragroup communications and determined by bistable devices 277/282F.

When these data are available in the register and when the buffer memory BUST is available, this being indicated by bistable device 100F being in its 1-condition, as shown by FIG. 2, a transfer order from the register REG to the buffer memory BUST will be given by the bistable devices of the register (not shown) which will deliver the signals 200$f$1, 201$f$1 and 205$f$1 in order to activate regenerator 100R in BUST. This regenerator will permit the passage of a pulse $t_2$ which will control coincidence gates between the 1-outputs of all the afore-mentioned bistable devices of the register and the 1-inputs of the corresponding bistable devices of the buffer memory i.e. 115F etc. This pulse $t_2$ at the output of regenerator 100R will also trigger the bistable device 101F in its 1-condition, so that the latter device during the same staticizing time unit will permit the passage of pulse $t_{10}$ from the output of regenerator 13R towards SUP, in order to allow this time the 1-outputs of the bistable devices of the buffer memory BUST such as 115F to print their condition on the supervision bistable devices SUP such as 15F. As indicated by the logic equations of the bistable devices 01F′ and 04F given previously, the regenerator 13R will also cause at the end of pulse $t_{10}$ the triggering of 01F′ in its 1-condition and of 0.04F in its 0-condition thus modifying the sequence order indicating the availability of the supervision row in a signalling sequence order 01. Consequently, during the twelfth pulse $t_{11}$ which is used to reinscribe in the coordinate memory the new sequence order 01 as well as the data transmitted from the register through the buffer memory will be inscribed in the coordinate memory to be re-staticized a supervision cycle later.

As indicated by FIG. 2, the regenerator circuit 13R is also respectively coupled to the inputs 1 and 0 of the bistable devices 100F and 101F of BUST, so that at the end of pulse $t_{10}$, the buffer memory will be brought back to its condition of availability to realize another transfer at the next staticizing time.

At the new staticizing operation of the information considered, the signalling sequence order 01 will cause the transfer of the units digits and of the tens digit of the calling line as determined by the bistable devices 30/39F on the corresponding output wires 50/59TCS of the distributing circuit TDCS permitting the common access towards the slave control equipments associated to the highways, from the supervision equipment SUP or the register REG (FIG. 1).

As indicated by FIG. 3, the transfer circuit TDCS is essentially constituted of regenerators such as 350/359R which are constituted by different coincidence gates of which three are represented on FIG. 3, and the outputs of which are mixed to constitute the output wires of the transfer circuit TDCS such as 50/59TCS. FIG. 3 indicates that the first coincidence gates, represented symbolically by the right-hand one, are controlled on the one hand by the signals 30/39$f$1 which correspond to the bistable devices 30/39F of the register being in their 1-condition, and by the signal of 18$r$1 which has to be present to authorize all these gates.

The signal 18$r$1 will thus authorize during the signalling sequence order 01 the sending of signals characterizing the last two digits of the calling subscriber on the wires 50/59TCS coupled to the different slave control equipments such as SL. Alternately, during the odd supervision cycles it will be regenerator 19R (middle gate) which will give a signal 19$r$1 to authorize the transfer of the last two digits of the called subscriber, materialized by the orders 60/69$f$1, towards the same output wires 50/59TCS coupled to the 100 slave control equipments associated to the subscriber's highways. FIG. 3 shows that the same regenerators 350/359R may also be used to produce on these same ten output wires 50/59TCS indications characterizing the last two digits of the calling subscriber delivered by the register REG. In other words the signals 230/238$f$1 are authorized by the signal 203$r$1 delivered by a corresponding regenerator in register REG (not shown).

Exactly in the same way as shown on FIG. 3, the regenerators 18R and 19R will respectively authorize for the calling subscriber during the even supervision cycles and for the called subscriber during the odd supervision cycles, the transfer of the remainder of the data characterizing the calling and called subscribers, i.e. the thousands and hundreds digits or, which is the same, the identity of the supergroup and of the group, and the identity of the channel or the channels used respectively on these groups or this group. The thousands digit will appear on the wires 40/44TCS at the output of TDCS at FIG. 1, the hundreds digit will appear on the wires 45/49 TCS always in two-out-of-five code, while the identity of the channel will appear on the wires 33/39TCS in three-out-of-seven code.

Moreover, always during the signalling sequence order 01, the regenerator 23R will authorize the transfer of the identities of the intermediate highways which must respectively be connected to the highways of the calling and called subscribers. This identity of the intermediate highways will be given on the seven wires 60/66TCS in a $$\binom{7}{3}$$

code of which only the twenty combinations $$\binom{5}{2}\binom{2}{1}$$

are used. The wires 65/66TCS are used for the control of 1 out of 2 and when wire 66TCS is activated, the two-out-of-five combinations marked on the wires 60/64TCS indicate the identity of the intermediate highway used for an intergroup communication, i.e. for the calling subscriber: the supergroup of the called subscriber and for the called subscriber: the supergroup of the called subscriber.

During the signalling sequence order 01 however, the supervision circuit SUP must still take care of sending ringing current towards the called subscriber and simultaneously, the ringing tone towards the calling subscriber, or still one of the busy tones towards the calling subscriber. These two signal sources may be transmitted to any highway of subscribers' groups by means of intermediate highways particular to these two signalling current sources and each having access to any subscriber's highway. These special intermediate highways have their identity indicated by a signal on wire 65TCS in concidence with a combination of two signals on the wires 60/64TCS. The regenerator 23R authorizes these intermediate highway identity transfers on the wires 60/66TCS which are multipled towards the different slave control equipments associated to the highways SK to permit the connection of the latter no longer towards a subscriber's line circuit, but towards an intermediate highway.

As will be remarked from the logic equation specifying the function of regenerator 23R, the latter operates either when it concerns an intergroup communication (15*f*1.16*f*) or an intragroup communication (15*f*1.17*f*1) but not when the register has informed the supervision equipment that the communication cannot be realized, for instance when the called subscriber has been found busy (16*f*1.17*f*1) in which case the regenerator 27R(28R) will give an authorization. The logic equation of 23R still indicates that the wave shape INTR also controls this regenerator in order to apply the current and tone at the desired rhythm. This pulse INTR has a duration of about one second, or more precisely of eight supervision cycles, and a period of about four seconds, or more precisely of 32 supervision cycles, i.e., it is clear that it may be easily produced by means of the wave shape T4 feeding the counting circuit 84/86F used at the release of one of the two subscribers.

It will moreover be remarked that regenerator 17R is also activated during the signalling sequence order 01 by pulses T¼ having the duration of a supervision cycle and a period equal to two of these cycles, i.e., about a fourth of a second. The release counter 84/86F is thus also used to control the ringing current and the ringing tone. After four steps, bistable device 86F′ is brought in its 1-condition and the signal 86*f*′0 has disappeared, so that the regenerator 23R is no longer controlled by the signals controlled by pulse INTR. Only when the called subscriber will reply or when the calling subscriber will release the connection without having obtained it, the signalling sequence order 01 will be modified as indicated further and the regenerator 16R will be reset to 0 then delivering a signal at its complementary output 16*r*0, this signal will cause the reset to 0 of the bistable device 86F′ part of the counter at the end of pulse $t_{10}$.

The different data which are present on the output wires of TDCS indicated at FIG. 1 will be used in the manner explained in the aforementioned patent to inscribe the tens and units digits of the calling and called lines in the slave memory SL associated to their respective highways and simultaneously the identity of the intermediate highways coupled to the signalling sources in the slave memories SK associated to these group highways to connect them with other highways. This is essentially produced by decoding the spatial identity of the time channels appearing on 33/39TCS by means of the comparator CMP which will produce at its output a pulse in the corresponding time channel. This pulse will be routed towards the pair of slave memories SL and SK among the hundred pairs corresponding to the calling or called subscriber's highway. This will be effected by means of gates such as G8 and G9 arranged in cascade to permit a two-stage selection, the first being controlled by wires 40/44TCS indicating the supergroup, and the second being controlled by wires 45/49TCS indicating the groups. As explained in the aforementioned patent, these wires giving the identity of the supergroup and of the group may of course control these gates forming a routing network, by means of decoders translating the 2-out-of-5 code into a 1-out-of-10 code.

In this way, the highway(s) of the calling and called subscribers will permit the transmission of a warning signal to these subscribers, either the ringing signal, or the ringing tone, or the busy signal, or another tone indicating that the communication cannot be realized.

It is to be remarked that the identity of the supergroup and of the calling and called subscribers group as well as of the channel of these subscribers are transferred towards the slave control equipments under the respective control of regenerators 20R and 21R during all the sequence orders 01 to 05 included, i.e., as soon as the corresponding supervision row is no longer free and until the moment it will be freed by the transfer of information towards the register.

During the sequence order 01, each time the corresponding word of the supervision is staticized, the regenerators 11R or 12R respectively for the calling subscriber or for the called subscriber will permit the supervision of the line condition of these subscribers in the way described in relation with FIG. 4.

The signalling condition characterized by the sequence order 01 will persist until the moment the called subscriber will take off the receiver (49*f*1) or else when the calling subscriber will abandon the connection (48*f*0). In the first case, the sequence order 01 is modified into 02 indicating the start of conversation.

The sequence order 02 is characterized by the bistable devices 00F′ and 02F′ being both in their 1-condition. The obtaining of this order is easily deduced from the logic equations of the bistable devices and regenerators given before. Under the control of this sequence order 02, the regenerators 18R and 19R will again allow the transfer of line identities towards the corresponding slave control equipments. Regenerators 24R and 25R will in case of an inter-group communication (15*f*1.16*f*1) authorize the transfer, respectively towards the slave memories of the highways of the calling and called subscribers, of the identity of the intermediate highway serving the highway of the calling subscriber and that of the called subscriber. These transfer operations towards SK (FIG. 1) will thus be executed by activating wire 66TCS in coincidence with signals appearing on two-out-of-five wires 60/64 TCS to materialize respectively the code of the supergroup of the called subscriber and that of the calling subscriber. On the other hand, if it concerns an intragroup communication (15*f*1.17*f*1) the regenerator 26R will be activated in order to transmit on the wires 60/66TCS the identity of the intra-group intermediate highway. This is indicated by signals on the wires 60, 61 and 65TCS. In all these sequences, the data previously stored in the memory lines controlling the connection of the highway(s) of the calling and called subscribers with the signalling intermediate highways, will have their data modified by those delivered by the supervision equipment, so that these group highways will now either be interconnected by the corresponding intemediate highway in case of an inter-group communication, or connected towards the speech storage devices by means of two distinct time channels used on the intra-group intermediate highway.

In case of such an intra-group communication, it will also be necessary to control the connection of this intragroup highway with that of the 12 intermediate speech storage devices of which the identity delivered by the register has been stored on the bistable devices 77/82G, this connection being established twice during each sampling period in order to secure a speech sampling transmission towards and from the called subscriber during the first channel time and towards and from the called subscriber during the second channel time. This identity transfer from the intermediate speech storage device is authorized by regenerator 22R which will thus allow signals 77/82*f*1 to be transmitted to the slave control equipment associated to the intra-group highway on the side of the 12 intermediate speech storage devices. The inscription of the identity of the intermediate speech storage device at the corresponding time of the delay lines constituting the slave memories will be done by decoding the identity of the two channels used and this by means of the comparator CMP in the same way as described previously in relation with the access towards the slave control equipments associated to the group highways. As indicated by FIG. 1, the output of comparator CMP may also be switched under the control of signal $22r1$ of regenerator 22R towards the slave control equipment SS by means of coincidence gate G'8.

In this way, as well when it concerns an intra-group communication as an intergroup communication the two subscribers will be put in communication with each other during the sequence order 02 by the inscription of adequate data in the slave control equipments associated to the highways permitting the connection between the two subscribers.

The sequence order 02 will also be used to transmit a signal towards an automatic bookkeeping equipment (not shown). Indeed, the sequence order 02 will authorize the identity transfer of the calling subscriber towards this equipment in order to determine a tariff of the communication. At the end of time $t_{10}$, this automatic bookkeeping equipment will deliver a signal AMA which will be effective to set the bistable devices 01F' and 00F' respectively to their 1- and 0-conditions so that the conversation condition is reached.

The sequence order 03 characterizes this conversation condition and corresponds to $01f'1.02f'1=03r1$. During this conversation condition the inscription of data in the slave control equipments associated to the highways used for the connection of the two subscribers is executed as during the sequence order 02 but there is no identity transfer of the calling subscriber towards the automatic bookkeeping equipment. Just as during the signalling condition 01, each time the word of the conversation taking place is staticized in the supervision circuit, the condition of the calling subscriber or of the called subscribed is supervised depending upon the fact that it concerns an even or odd supervision cycle. This supervision operation is executed as described previously in relation with FIG. 4.

Just as in the case of the signalling condition 01, where there were two possible alternatives of which one, the release of the calling subscriber without obtaining the communication has still to be considered in detail, the conversation may be achieved either due to the release of the calling subscriber which release will be detected during an even supervision cycle or due to the release of the called subscribed which release will be detected during the odd supervision cycle. In the first case ($48f0$) the release condition A is reached. Indeed, the conditions of the bistable devices 00/03F' will respectively be modified into 1,0,0 and 1. The sequence order 04 or the release condition A corresponds to this new condition of the bistable devices 00/04F, i.e., $$000f'1.03f'1=04r1$$

For this sequence order the regenerator 04R will send a signal towards the transfer circuit TDCL used in common by the supervision equipment SUP and by the register REG to reach the circuit LILI. Indeed, this circuit comprises a memory of the condition of the different subscriber's lines and as the calling subscriber has released, the memory identifying its condition has to be modified so that the binary device registering this condition should now indicate that the line of the calling subscriber is open. The coincidence gate G404 in TDCL will authorize the transmission of a pulse $t_4$ on wire 21TCL coupled with the line equipment, under the control not only of the regenerator 04R but also of the regenerator 11R controlling the transfer of data relating to the calling subscriber and which is only allowed during the even supervision cycles. This regenerator 11R always authorizes during these same supervision cycles the identity transfer of the calling subscriber, characterized by the bistable devices 20/39F, towards the circuit LILI, so that these data might modify the condition of the line memory of the calling subscriber. Hence, a signal will appear on wire 72TDL indicating that the calling subscriber has released.

During this time, the wires 33/49TCS coupling the transfer circuit TDCS (FIG. 1) with the slave control equipments associated to the highways are always activated in concordance with the identity of the channel, of the supergroup and of the group of the calling subscriber, but the regenerators 18R and 22R are no longer activated during the sequence order 04, so that the wires 50/66TCS no longer transmit the identity of the calling line and the identity of the intermediate highway towards the slave control equipments SL and SK. In this manner and as explained in the aforementioned patent, the slave control memories no longer unblock the gates, associated to the highway of the calling subscriber during his channel time, on the one hand towards his line circuit and on the other hand towards the called line through the called highway.

It will be recalled that the signalling condition 01 might also correspond to the calling subscriber receiving a busy or a special tone. When the calling subscriber releases, one will obtain in this case the sequence order 04 directly from the sequence order 01, as indicated by the logic equations of the bistable devices characterizing the sequence orders. In this case, the operations are similar to those described above, i.e. the new state of the calling line will now be registered in LILI as being that of a line the loop of which is open, and the connection between the calling line and the signalling source will be interrupted due to the lack of an overwriting in the corresponding slave control memories.

Also, the sequence order 04 may also be reached when the calling subscriber has released due to the called subscriber not answering, i.e. during the emission of the ringing tone.

On the other hand, during the sequence order 03, the called subscriber may be the first to release. In this case, the counting circuit constituted by 84/86F is triggered. If before 28 seconds after the triggering of this counting circuit, the calling subscriber also releases, this counting circuit is reset to 0 by signal $16r0$ and in these conditions the sequence order 04 is reached in the same manner as described previously for a communication interrupted by the release of the calling subscriber. On the other hand, if the calling subscriber has not yet released at the end of 28 seconds, the release condition A corresponding to the sequence order 04 will then be reached under the control of the counting circuit. This is the case of a forced release of the connection. This release is executed under the control of regenerator 10R, signal $10r1$ leading to the establishment of the sequence order 04. The sequence order 04 characterizing the release condition A will now be maintained as long as the called subscriber has not released. During the even supervision cycle wherein the calling subscriber's line memory is modified in order to indicate that the subscriber has answered, one might also detect if the called subscriber has also released. Two cases are possible, the called subscriber has already released or his line is still closed. In the first case, one will pass to the release condition B or the sequence order 05, while in the second case the counting device 84/86F determining a 28 seconds delay will be triggered in the manner explained previously in the case the called subscriber had released first. If in the present case after the release of the calling subscriber, the called subscriber releases within the 28 seconds, one will also reach the release condition B characterized by the sequence order 05. If this release of the called subscriber did not occur at the end of this delay, just as explained previously, the following condition, i.e. that characterized by the sequence order 05, will be reached under the control of the counting circuit.

The release condition B is characterized by $$01f'1.03f'1=05r1$$

and is obtained when at the end of the preceding staticizing time and more precisely at the end of pulse $t_{10}$, the release of the called subscriber (49$f$0) had set 01F′ and 00F′ in their 1- and 0-conditions respectively. During the release condition B, the operations will be substantially analogous to those which have taken place during the release condition A described above and these operations might be easily followed by means of the logic equations of the different bistable devices and regenerators, as well as by means of the drawings. The essential difference is however that all these operations will now be produced in relation with the called subscriber, this in correspondence with the pulses B characterizing the odd supervision cycles used for the operations relating to the called subscriber.

Referring to FIG. 4, it is seen that in the present case the regenerator 05R in SUP will permit to send the signal towards LILI via the coincidence gate G405 in TDCL, this signal being still authorized by the regenerator 12R of SUP. This signal will thus reset the line memory of the called subscriber in its rest condition. Moreover, and in the same way as for the calling subscriber at the release condition A, the speech connections used by the called subscriber will be released due to the lack of reinscription of these data in the corresponding slave delay memories (FIG. 1), SL, SK and eventually SS when it concerns the release of an intragroup communication.

At the end of the considered staticizing time during which the release condition B was present, and more precisely at the end of pulse $t_{10}$, the bistable devices 02F′ and 01F′ will be triggered in their 1- and 0-conditions respectively, under the control of signal 05$r$1 characterizing this release condition 05, and also under the control of the signal 21$r$1 relating to the selection of the slave equipments of the called subscriber. Consequently the bistable devices 02F′ and 03F′ will now be the only ones among the series of bistable devices affected to the sequence orders, which will produce 1-conditions. Hence these conditions characterizing the following sequence order will be reinscribed in the supervision coordinate memory to be read during the same staticizing time of the next supervision cycle.

The transfer condition or sequence order 06 characterized by 06R=02$f$′1.03$f$′1 is used when the supervision equipment has finished its control due to the release of the two subscribers engaged in a communication. It gives rise to the transfer of data which had initially been transmitted from the register during the sequence order 00, in return towards this register. In the two cases, as already explained for the sequence order 00, these transfers from the register of the supervision equipment are realized via the buffer memory BUST which has been represented in more detail at FIG. 2. This re-transfer of data towards the register is particularly useful in the case of a communication system operating according to the time division multiplex principle and the principle of the time channel alinement for a given communication. Indeed, in this case it is advantageous to provide a central occupation memory of the different highways channels which may be used for te communications. The register, an essential function of which is to control the establishment of any new communication in response to a call, must of course have access to this occupation memory of the channels on the various highways, in order to be able to send it data characterizing the highways involved, particularly due to the receipt of the identity of the called subscriber. This must be so in order that the circuits of this memory send to the register in return the identity of a time channel simultaneously free on the highways which have to be used for the communication, i.e. in case of an intergroup communication, the highway of the calling subscriber, the intermediate highway and the highway of the called subscriber. Such a channel alinement system is described in the U.S. Patent 3,158,689 (J. Masure).

Just as it has previously been described that the subscribers' line memory LILI was put up-to-date at the end of a communication, so that at a new closure of the subscriber's loop, this closure might be identified as characterizing a call, it is also necessary to put up-to-date, as soon as a communication is finished, the memory of occupation conditions of the various channels on the highways, so that these channels might immediately be available to realize a requested alinement for another communication.

Consequently, in order to avoid a special access circuit between the supervision circuit and this memory equipment of the occupation condition of the channels, the access circuits already provided between this memory and the register may be advantageously used by means of this retransfer of data between the supervision equipment and the register.

The sequence order 06 corresponding to 02$f$′1.03$f$′1 will have for effect that during time $t_1$, the regenerator 101R in the buffer circuit BUST (FIG. 2) will emit a signal on condition that this buffer memory is available i.e. that its control bistable device 100F is in its 1-condition. In this case, at the end of pulse $t_1$, bistable device 102F will be set to its 1-condition indicating in the buffer memory the data transfer condition towards the register REG, while bistable device 100F will be reset to its 0-condition.

Moreover, this same signal (end of pulse $t_1$) will permit the transfer of data contained in the different bistable devices such as 15/18F, etc. to the corresponding bistable devices such as 115/118F of BUST. One will note here that it thus concerns data which had initially been transmitted by the register REG, including the class of call as defined by the bistable devices 15/18F. It will be particularly recalled that the supervision equipment may have been charged by the register to control the sending of a busy tone or a special tone towards the calling subscriber and that in this case one will finally obtain the sequence order 0.6 after the release of the calling subscriber.

At the end of the pulse $t_{10}$, in SUP (FIG. 2) the regenerator 14R will reset all the bistable devices of the supervision circuit to their 0-condition, including the bistable devices 47/49F and 84/86F not represented on FIG. 2, but with the exception of the bistable devices characterizing the sequence orders. It should thus be remarked that due to the resetting operation to 0 of the bistable devices being executed by the pulse $t_{10}$ and not by the pulse $t_{11}$, the 0-condition of all these bistable devices, with the exception of those characterizing the sequence orders, will be stored in the row staticized by the coordinate memory. For the bistable devices of the sequence orders, the signal 0.6$r$1 of the regenerator 0.6R will have for effect to reset to their 0-condition the bistable devices 02/03F′ and to set to their 1-condition the bistable devices 00F′ and 04F, thus characterizing the availability condition 00 which will be re-inscribed in the corresponding row of the supervision memory.

In the circuit of the buffer memory BUST (FIG. 2) the signals 203/204$f$ and 208/209$f$1 of the register REG will allow the regenerator 202R in this register to deliver a pulse $t_2$ under the authorization of the bistable device 102F in its 1-condition. The signal delivered by this regenerator will have, as indicated, the effect of translating the states of the data bistable devices such as 115/118F in BUST on the corresponding bistable devices 215/218F in REG. The same signals of the register will also have for effect that the regenerator 102R in BUST will deliver a pulse $t_2$ for the resetting to their 0-condition the bistable devices such as 115/118F of BUST. This resetting to 0 being of course only effective after the condition of the bistable devices of BUST has been copied by the bistables of REG. Finally, the signal delivered by 202R will also reset the bistable devices 100F and 102F to their 1- and 0-conditions respectively, thus indicating that the buffer memory BUST is again available for a data transfer as soon as the following staticizing time starts.

One will notice that the system described above, and namely with respect to the buffer memory, is in no way limited to the described detailed embodiment. Particularly, this buffer memory may moreover include a larger number of memory components in order that it might memorize data relating to more than one communication. One might for instance provide a buffer memory for the transfer of data from the register to the supervision equipment and a second memory for the transfer of information in the opposite sense. However, for the transfer of data between these two equipments in the manner described, even for a large exchange, the described solution is particularly advantageous as it only uses one very simple buffer memory which only needs one set of bistable devices permitting to register the data of one single communication at once.

It will also be evident, that while the invention has been described by referring only to a particular telephone exchange, it may also be applied in case of incoming and outgoing communications from and to other exchanges, incoming and outgoing highways then interfering instead of the highway of the calling or called subscriber, as describer in the U.S. patent application S.N. 63,203, filed October 17, 1960 (H. Adelaar).

While the principles of the invention have been described above in connection with specific apparatus, it is to be clearly understood that this description is made only by way of example and not as a limitation on the scope of the invention.

We claim:

1. A control system for a communication network, said network comprising a plurality of time division multiplex highways, slave control means individually associated with each of said highways for controlling the establishment of calls over said individual highways, means in each of said slave control means for storing data relative to connections established on said time division basis, said control system being common to said slave control means, said control system comprising two main control equipments for operating said slave control means, means for storing statistics relative to the establishment of calls in said main equipments on a time division basis, and means whereby the time base distribution cycle for the storage of statistics in said main equipments are independent of other system time basis.

2. The control system of claim 1 wherein one of said main control equipments comprises a first register for storing data relative to the establishment or release of calls, the second of said main control equipments comprises a second register for storing data relative to already established or routed calls, said first register having substantially less capacity than said second register, whereby the time distribution base for said first register is substantially less than the time distribution base of said second register.

3. The control system of claim 2 and a buffer memory means interposed between said first and second registers, and means for transferring data stored in one of said registers into storage in the other of said registers via the buffer memory means.

4. The control system of claim 3 and means whereby said main control equipments are connected to said slave control means via common access equipment, and means for transferring said data from said main control equipments through said access equipment to said slave control means.

5. The control system of claim 4 and means whereby one complete cycle of the time division base for said second register equals the product of the time required to store a data word of said statistics times the number of words to be stored, said access equipment comprising gate circuits for transmitting said stored statistics from said main control equipments to said slave control means during periods in said time base defined by positive and negative half-cycles, and means for gating information from one of said main control equipments during time cycles of one polarity and from the other of said control equipments during time cycles of opposite polarity.

6. The control system of claim 5 wherein some of said statistics relates to a calling line and other of said statistics relates to a called line, means whereby the part of said statistics that relates to a calling line is gated from said main control equipments toward said slave control means during even cycles and the part of said statistics that relates to a called line is gated during odd cycles.

7. The control system of claim 4 and a line condition detector, two way gate means interposed between said main control equipments and said detector, said gate means functioning to transfer said statistics between said main control equipments and said detector during a fraction of the time required to record said statistics in said register means, and means for dividing the time for said transfer of data into at least two parts to separate the transfer of said statistics from said first and said second main control equipments.

8. The control system of claim 1 and means whereby said main control equipments store sequence orders for directing operations during statistics storage times, means for modifying said sequence orders responsive to the statistics received by said main control equipments, and means for reinscribing said modified sequence order after storage of said statistics.

9. The control system of claim 8 wherein the second of said main control equipments comprises a plurality of bistable devices for storing and reinscribing statistics relative to the condition of calling and called lines.

10. The control system of claim 9 and an additional bistable device for recording the busy or idle condition of a calling subscriber line, and means for twice checking said busy or idle condition to avoid a premature release of a connection.

11. The control system of claim 3 and means whereby the statistics transferred through said buffer memory means comprises the identity of the calling and called line, and of the interconnecting time channels.

12. The control system of claim 11 and means whereby the transferred statistics comprises the identity of a class of call and an indication of whether the called line is idle.

13. The control system of claim 12 and means for releasing a call connection a predetermined period of time after either subscriber hangs up.

14. The control system of claim 3 and means for accounting for call charges, and means for transferring said statistics from said second register to accounting equipment.

15. The control equipment of claim 3 and means responsive to either of said two main equipments for registering a single word of said statistics in said buffer memory means.

16. The control equipment of claim 3 wherein said buffer comprises a plurality of bistable devices, and means for operating said bistable devices in parallel.

References Cited by the Examiner

UNITED STATES PATENTS

| | | | |
|---|---|---|---|
| 2,921,137 | 1/1960 | Morris et al. | 179—18 |
| 2,934,606 | 4/1960 | Trousdale | 179—18 |
| 2,951,126 | 8/1960 | Brightman | 179—18 |
| 2,968,698 | 1/1961 | Brightman | 179—18 |

ROBERT H. ROSE, *Primary Examiner.*

WALTER L. LYNDE, *Examiner.*